États-Unis Patent Office 2,941,003
Patented June 14, 1960

2,941,003

NEW SULFUR AND PHOSPHORUS-CONTAINING HYDROXY POLYAMINES AND THEIR PREPARATION

Edward C. Shokal, Walnut Creek, Calif., assignor to Shell Oil Company, a corporation of Delaware No Drawing. Filed Apr. 30, 1956, Ser. No. 581,290

7 Claims. (Cl. 260—563)

This invention relates to a new class of polyamines. More particularly, the invention relates to new sulfur and phosphorus-containing hydroxy polyamines, to a method for their preparation and to the use of the new compounds, particularly as curing agents for polyepoxides.

Specifically, the invention provides new and particularly useful polyamines having a sulfur or phosphorus hydroxy-containing radical attached through carbon to one or more of the terminal amine nitrogen atoms, such as, for example N-(3-ethylthio-2-hydroxypropyl) diethylene triamine. The invention further provides a method for preparing these compounds which preferably comprises reacting a mercaptan or phosphine containing an active hydrogen attached to the sulfur or phosphorus atom with an epoxy halide to form a halohydrin, dehydrochlorinating and then reacting the resulting compound with a polyamine. The invention further relates to the use of the above-described compounds as curing agents for polyepoxides, and particularly the commercially available polyglycidyl ethers of polyhydric phenols (Epon resins).

Polyepoxides, such as those obtained by reacting epichlorohydrin with polyhydric phenols in the presence of caustic, can be cured with amines, such as diethylene triamine, to form insoluble resins. The use of these amines to cure the polyepoxides, however, has not been entirely satisfactory for commercial operations. The amines as a class have rather obnoxious odors and a high order of toxicity. As the curing operation is ordinarily conducted with the compositions containing the amines open to the atmosphere of the room into which some vapors of the amines permeate, the odors are quite disagreeable and sometimes cause irritation of the skin of the operators. In addition, the amines do not initiate the cure at the lower temperatures as quickly as desired for many applications. Further, many of the amines can be used only in a substantially dry atmosphere and show little activity when there is a large amount of moisture in the air.

It is an object of the invention, therefore, to provide a new class of compounds that are particularly useful as curing agents for polyepoxides. It is a further object to provide new sulfur or phosphorus containing hydroxy polyamines and a method for their preparation. It is a further object to provide new sulfur or phosphorus containing hydroxy polyamines which have low volatility and a low order of toxicity. It is a further object to provide new sulfur or phosphorus containing hydroxy polyamines which cure polyepoxides at a relatively fast rate to form hard solvent resistant products. It is a further object to provide new sulfur or phosphorus containing hydroxy polyamines which are active as curing agents even at relatively high humidities. Other objects and advantages of the invention will be apparent from the following detailed description thereof.

It has now been discovered that these and other objects may be accomplished by the compounds of the present invention comprising polyamines having a sulfur or phosphorus hydroxy-containing radical attached through carbon to one or more of the amine nitrogen atoms. These special polyamines have been found to be very good curing agents for polyepoxides. They have substantially no odor, low volatility and a low order of toxicity. In addition, they act quickly to cure the polyepoxides to hard chemical resistant products even in the presence of large amounts of moisture.

As noted, the new compounds of the invention comprise polyamines having a sulfur or phosphorus hydroxy-containing radical attached through carbon to one or more of the amine nitrogen atoms. The sulfur or phosphorus hydroxy-containing radicals are preferably aliphatic, cycloaliphatic or aromatic radicals, and more preferably radicals of the formula

wherein X is S, SO or $SO_2$,

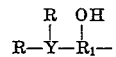

wherein Y is P or P=O, R being a monovalent aliphatic, cycloaliphatic or aromatic hydrocarbon radical, preferably containing no more than 12 carbon atoms, and $R_1$ being a bivalent hydroxy-substituted aliphatic, cycloaliphatic or aromatic hydrocarbon radical, preferably containing no more than 10 carbon atoms.

Examples of the new sulfur or phosphorus hydroxy-containing polyamines include, among others, N-(3-ethylthio-2-hydroxypropyl) triethlyene tetraamine, N-(4-phenylthio-3-hydroxybutyl) pentamethylene diamine, N-(3-ethylthio-2-hydroxypropyl) m-phenylene diamine, N-(3-cyclohexylthio-2-hydroxypropyl) ethylene diamine, N-(3-ethylsulfinyl-2-hydroxypropyl)diethylene triamine, N-(3-dodecylthio-2-hydroxypropyl) hexamethylene diamine, N-(5-hexylthio-4-hydroxypentyl) diethylene triamine, N-(3-ethyl sulfonyl-2-hydroxypropyl) m-phenylene diamine, N-(5-diethyl-phosphino-4-hydroxypentyl) ethylene diamine

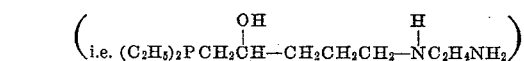

N-(3-hexylsulfonyl-2-hydroxypropyl) triethylene tetraamine, N-(3-ethylthio-2-hydroxypropyl) methylene dianiline, N-(3-diethylphospino-2-hydroxypropyl) diethylene triamine, N-(3-ethylthio-2-hydroxypropyl) p-phenylene diamine, N-(3-diphenylphosphino-2-hydroxypropyl) triethylene tetraamine, N-(3-dicyclohexylphosphino-2-hydroxypropyl) pentamethylene tetraamine N-(3-didodecylphosphino-2-hydroxypropyl) diethylene triamine, N-(3-allylthio-2-hydroxypropyl) hexamethylene diamine, N-(3-diethylphosphinyl-2-hydroxypropyl) diethylene triamine

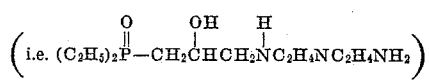

N-(3-isobutylthio-2-hydroxypropyl) octamethylene diamine, N-(3-dibutyl phosphinyl-2-hydroxypropyl) m-phenylene diamine and N-(3-ethylthio-2-hydroxypropyl) dodecylmethylene diamine.

Preferred sulfur-containing compounds of the invention include the N-(alkylthiohydroxyalkyl) aliphatic and aromatic polyamines, the N-(cycloalkylthiohydroxyalkyl) aliphatic and aromatic polyamines and the N-(arylthiohydroxyalkyl) aliphatic and aromatic polyamines. Preferred phosphorus-containing compounds of the invention include the N-(dialkylphosphinohydroxyalkyl) aliphatic and aromatic polyamines, the N-(dicycloalkylphosphinohydroxyalkyl) aliphatic and aromatic polyamines and the N-(diarylphosphinohydroxyalkyl) aliphatic and aromatic polyamines. In the above-described description of the preferred compounds, the alkyl, cycloalkyl and aryl groups preferred contain no more than 10 carbon atoms and the aliphatic and aromatic polyamine portion of the molecule preferably contain no more than 14 carbon atoms.

The new thio-containing (—S—) and phosphino-containing

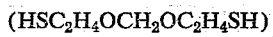

hydroxy polyamines described above are preferably prepared by reacting a mercaptan or phosphine containing an active hydrogen attached to the sulfur or phosphorus atom with an epoxy halide to form a chlorohydrin, dehydrochlorinating this product to form an epoxy compound and then reacting this with the desired polyamine. This method may be illustrated by the following equations showing the reaction between ethyl mercaptan and epichlorohydrin to form 3-ethylthio-2-hydroxypropyl chloride, the dehydrochlorination of this product and the reaction of the resulting epoxide with ethylene diamine to form N-(3-ethylthio-2-hydroxypropyl) ethylene diamine:

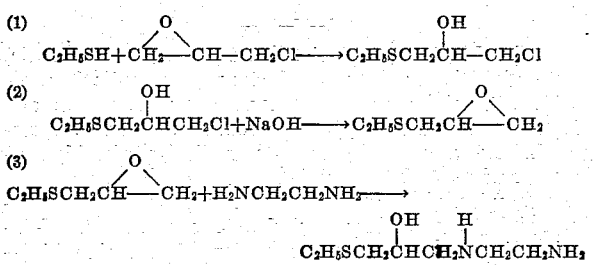

Mercaptans that may be used for this reaction include the aliphatic, cycloaliphatic and aromatic mercaptans, such as, for example, ethyl mercaptan, butyl mercaptan, phenyl mercaptan, benzyl mercaptan, octyl mercaptan, dodecyl mercaptan, tetradecyl mercaptan, octadecyl mercaptan, cyclohexyl mercaptan, cyclopentyl mercaptan, allyl mercaptan, butenyl mercaptan, cyclohexenyl mercaptan, 1,5-pentanedithiol, 1,4-butanedithiol, 1,4-cyclohexanedithiol, dimercapto diethyl formal (HSC$_2$H$_4$OCH$_2$OC$_2$H$_4$SH)

3,3′-thiodipropanethiol, 4,4′-thiohexanethiol, dihydrofuran-2,5-dibutanethiol and the like, and mixtures thereof. Polythiols prepared by the reaction of hydrogen sulfide with polyepoxides as disclosed in U.S. Patent 2,633,458 represent other examples of mercaptans that may be used in the process. Preferred mercaptans include the alkyl, cycloalkyl, aryl and alkaryl mercaptans containing no more than 12 carbon atoms per sulfur atom.

The phosphines used in the preparation of the phosphino-containing hydroxy polyamines are preferably the dihydrocarbyl phosphines, such as, for example, dicyclohexyl phosphine, dioctyl phosphine, diphenyl phosphine, dibutyl phosphine, dicyclopentyl phosphine, butyl cyclohexyl phosphine, didodecyl phosphine, dicyclohexenyl phosphine and the like. Particularly preferred phosphines include the dialkyl, dicycloalkyl and diaryl phosphines containing no more than 12 carbon atoms. Coming under special consideration, particularly because of their high degree of reactivity, are the aromatic hydrocarbyl phosphines.

The epoxy halides used in the process described above are those possessing a vic-epoxy group, i.e., a

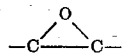

group, and a halogen atom which is preferably not more than 6 carbon atoms removed from the vic-epoxy group. Examples of these epoxy halides include, among others, epichlorohydrin, epibromohydrin, 1,2-epoxy-4-chlorobutane, 1,2 - epoxy - 5 - chlorohexane, 1,2 - epoxy - 4 - chlorooctane, 1,2-epoxy-3-chlorocyclohexane, 1,2-epoxy-4-chlorododecane, and the like. Especially preferred are the epoxyalkyl halides containing no more than 8 carbon atoms.

Polyamines used in the preparation of the claimed compounds include the aliphatic, cycloaliphatic and aromatic di-, tri- or polyamines, such as, for example, ortho, meta and para-phenylene diamine, diaminodiphenylmethane, p,p′-methylene dianiline, p,p′-diamino diphenyl sulfone, triaminobenzene, 2,4-diaminotoluene, 3,3′-diamino diphenyl, 1,3-diamino-4-isopropylbenzene, 1,3-diamino-4,5-diethylbenzene, diaminostilbene, ethylene diamine, diethylene triamine, tetraethylene pentamine, pentamethylene diamine, hexamethylene diamine, 1,10-diaminododecane, 1,4-diamino-5,8-diethyldodecane, 1,4,6-triaminodecane, 1,8-diamino-6-dodecene, 3-aminobutyl-6-aminooctane, 1,4-diaminocyclohexane, 1,2,5-triaminocyclohexane, 1,3-diaminocyclopentane and the like. Preferred polyamines are the aliphatic and aromatic possessing from 2 to 4 amino nitrogen and containing up to 15 carbon atoms, such as, for example, ethylene diamine, trimethylene diamine, pentamethylene diamine, diethylene triamine, triethylene tetraamine, 1,3-diaminobenzene, metaphenylene diamine, p,p′-diamino diphenyl sulfone, triaminobenzene, and the like. Especially preferred are the polyamines of the formula $$X(NH_2)_n$$

wherein X is a member of the group consisting of saturated aliphatic hydrocarbon radicals, —R$_1$NR$_1$—, —R$_1$NR$_1$NR$_1$— radicals (wherein R$_1$ is a bivalent aliphatic hydrocarbon radical), aromatic hydrocarbon radicals and alkyl-substituted aromatic hydrocarbon radical, each radical preferably containing no more than 13 carbon atoms.

The reaction between the mercaptans (or phosphines) and the epoxy halides may be accomplished by merely mixing the two reactants together in approximately equal molar amounts. The reaction is generally exothermic so it is preferred to employ cooling means. Suitable temperatures for the reaction range from about 10° C. to about 30° C., but higher temperatures may be used as desired. Solvents may be utilized if desired but are generally not necessary.

The thio- (or phosphino-) hydroxy-containing halide prepared by the above process is then treated with an alkaline material to dehydrohalogenate the said product. This dehydrohalogenation reaction may be effected in the same reaction medium used in the preparation of the halide or the halide may be recovered and purified before being used in the dehydrohalogenation reaction.

Any of the known dehydrohalogenating materials may be used in this reaction, such as sodium and potassium hydroxide, sodium and potassium carbonates and bicarbonates, borax, hydroxides of magnesium, zinc, lead, iron and aluminum, and the corresponding oxides, etc. The aluminates, silicates and zincates of alkali salts, such as sodium and potassium aluminate and sodium and potassium zincate, are particularly good dehydrohalogenating agents when used in substantially, or completely, non-aqueous media. The amount of the dehydrohalogenating agent used will vary over a wide range. Preferably at least one mol of the alkaline material should be used for every halohydrin group to be converted to epoxy groups.

The alkaline agent may be applied to the halohydrin as an aqueous solution or suspension or dissolved in an inert solvent, such as hydrocarbons, ethers, esters and the like. The above-noted aluminates, silicates or zincates are preferably used in non-aqueous media.

In most cases, the dehydrohalogenation reaction is initiated on contact of the reactants at room temperature. The reaction is usually exothermic and sufficient heat is generally liberated to permit one to conduct the reaction at the desired temperature without resort to the use of external heating means. In some cases, it may be desirable to cool the reaction mixture during the contacting of the reactants. If reaction is conducted in the presence of water, it is generally preferred to maintain the temperature below about 50° C. to prevent hydrolysis of the epoxide groups. If the above-described aluminates, etc., are used in non-aqueous systems, higher temperatures, such as 50° C. to 100° C. may be used.

At the end of the reaction period, the reaction mixture which is preferably diluted with solvents such as benzene, is then filtered through a suitable filtering medium, e.g., diatomaceous earth, to remove the alkali metal halide and any excess catalyst. The product can then be used directly in the reaction with the polyamine or, if desired, may be purified by distillation, extraction or the like, and then used in the reaction.

The reaction between the sulfur (or phosphorus) containing epoxide and the polyamine may be accomplished by merely bringing the two reactants together in proper proportions and heating. Best products are obtained when the epoxide is reacted with equal molar to 4 mol excess of the polyamine. However, it is possible to prepare other products having utility as curing agents for the polyepoxides by using an excess of the epoxide so as to effect a reaction with more than one of the amino hydrogen atoms. The mixture of epoxide and polyamine is preferably maintained at a temperature ranging from 20° C. to 100° C. and preferably 60° C. to 100° C. Solvents and diluents may be employed in this reaction if desired or necessary. Suitable solvents include inert hydrocarbons, such as benzene, toluene and xylene.

The new thio or phosphino-hydroxy-containing polyamines may be recovered by any suitable means, such as distillation, extraction, fractional precipitation and the like. They are preferably recovered by removing the excess reactants by distillation and recovering the compounds as bottoms products.

Another less preferred method for preparation of the thio or phosphino-hydroxy containing polyamines comprises reacting the mercaptan or phosphine with an epoxy halide and then reacting the resulting sulfur or phosphorus-containing hydroxy-containing halide with the polyamine in the presence of an HCl acceptor, such as NaOH. This is illustrated by the following equations showing the preparation of N-(3-ethylthio-2-hydroxypropyl) ethylene diamine from ethyl mercaptan, epichlorohydrin and ethylene diamine:

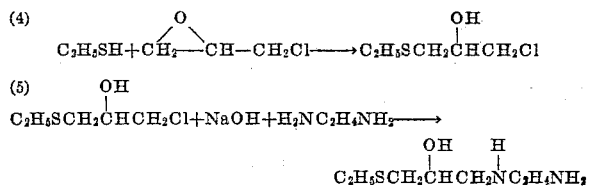

The reaction shown in Equation 4 is the same as that in Equation 1 above and is conducted in the same manner. The reaction shown in Equation 5 is accomplished by reacting the sulfur- (or phosphorus) hydroxy-containing halide and the polyamine in proper proportions and heating in the presence of the HCl acceptor. Best products are obtained when the hydroxy-containing halides are reacted with equal molar to 4 mol excess of the polyamine, but products having some utility may also be obtained by using the excess of the hydroxy-containing halide. The mixture of halide and polyamine is preferably maintained at a temperature ranging from 50° C. to 150° C. and preferably 60° C. to 100° C. Heating is preferably maintained until the hydrogen halide is substantially removed. The products prepared by this method may also be recovered by suitable means, such as distillation, extraction and fractional precipitation.

The new sulfinyl- and sulfonyl-containing hydroxy polyamines and the new phosphinyl-containing hydroxy polyamines described above may be obtained by oxidation of the corresponding thio-containing or phosphino-containing hydroxy polyamines, or more preferably, by oxidizing one of the reactants during the preparation as described above. Thus, N-(3-ethylsulfonyl-2-hydroxypropyl) ethylene diamine may be prepared by reacting ethyl mercaptan with epichlorohydrin as described above, then oxidizing this reactant to the corresponding sulfonyl derivative, i.e., 3-ethylsulfonyl-2-hydroxypropylchloride. This oxidized product may then be reacted with caustic to form the epoxide and the epoxide reacted with ethylene diamine as in Equations 2 and 3 above.

The oxidation of the thio- or phosphino-derivatives as described above may be effected by the use of a large number of oxidizing agents, such as hydrogen peroxide, permanganates, bromides, fuming nitric acid, chromic acid, perbenzoic acid, and the like. The exact one selected will depend upon the particular type of derivative to be oxidized. The amount of the oxidizing agent to be employed will vary over a considerable range. It is generally desirable to react the thio- and phosphino-derivatives with at least one chemical equivalent amount of the oxidizing agent in the production of the sulfinyl (i.e. —SO—) and phosphino (i.e. —PO—) derivatives, while in the production of the sulfonyl (i.e. —SO$_2$—) derivatives, the agent is preferably used in approximately twice the chemical equivalent amount. As used herein, in relation to the oxidizing agents, the expression "chemical equivalent amount" refers to the amount of agent needed to furnish one atom of oxygen for every thio or phosphino linkage to be oxidized. Still more preferably, the reactants are combined in chemical equivalent ratios varying from 1:1 to 1:2.5.

The oxidation may be accomplished in the presence of solvents or diluents. Examples of suitable solvents or diluents include, among others, benzene, toluene, xylene, and the like, and mixtures thereof.

The temperature employed during the oxidation may vary over a considerable range depending on the type of reactants and oxidizing agents employed. It is generally desirable to maintain the temperature between about 30° C. and 100° C., with a preferred range varying from 50° C. to 100° C. Cooling may be employed if necessary. Atmospheric, superatmospheric and subatmospheric pressures may be employed as desired.

In the event that the oxidized product is an intermediate in the preparation of the claimed products, they may be used directly in the reaction mixture without further purification or they may be recovered and purified before further reaction. If the oxidized product is the desired finished product, it may be recovered by any suitable means, such as distillation, extraction, fractional precipitation and the like.

The new sulfur or phosphorus hydroxy-containing polyamines of the present invention vary from colorless free-flowing liquids to semi-solids. They are soluble in and compatible with a great many organic solvents and synthetic oils and resins. They have a relatively high boiling point and a low order of toxicity toward humans. They further show considerable reactivity through the amino hydrogen atoms and react very quickly with polyepoxide materials to convert them to soluble infusible resins having good hardness and solvent resistance. In view of these properties, they find considerable use as curing agents for polyepoxide resins, particularly in applications, such as pottings, castings, auto body repair work, laminates, etc., where there is need for fast reacting curing agents but agents which have low volatility and are not highly toxic.

The polyepoxides may be cured with the new sulfur or phosphorus hydroxy-containing polyamines by merely mixing the two components together. The reaction occurs slowly at temperature as low as about 20° C. and for best results it is best to heat the mixture between about 40° C. and about 200° C. Particularly preferred temperatures range from about 40° C. to about 150° C.

The amount of curing agent employed in the cure of the polyepoxides may vary over a considerable range. Amounts of adduct can range from about 5 parts per 100 parts of polyepoxide up to 40 parts per 100 parts of polyepoxide. Best results are obtained, however, when the adduct is employed in amounts varying from 10 to 30 parts per 100 parts of polyepoxide.

In curing the polyepoxide, it is usually desirable to have the polyepoxide in a mobile condition when the sulfur or phosphorus hydroxy-substituted polyamine is added in order to facilitate mixing. The polyepoxides, such as the glycidyl polyether of polyhydric phenols, are generally very viscous to solid materials at ordinary temperature. With those that are liquid, but too viscous for ready mixing, they are either heated to reduce the viscosity, or have a liquid solvent added thereto in order to provide fluidity. Normally solid members are likewise either melted or mixed with a liquid solvent. Various solvents are suitable for achieving fluidity of polyepoxide. These may be volatile solvents which escape from the polyepoxide compositions containing the adduct by evaporation before or during the curing such as ketones like acetone, methyl ethyl ketone, methyl isobutyl ketone, isophorone, etc., esters such as ethyl acetate, butyl acetate, Cellosolve acetate (ethylene glycol monoacetate), methyl Cellosolve acetate (acetate of ethylene glycol monomethyl ether), etc., ether alcohols, such as methyl, ethyl or butyl ether of ethylene glycol or diethylene glycol; chlorinated hydrocarbons, such as trichloropropane, chloroform, etc. To save expense, these active solvents may be used in admixture with aromatic hydrocarbons such as benzene, toluene, xylene, etc., and/or alcohols such as ethyl, isopropyl or n-butyl alcohol. Solvents which remain in the cured compositions may also be used, such as diethyl phthalate, dibutyl phthalate and the like, as well as cyano-substituted hydrocarbons, such as acetonitrile, propionitrile, adiponitrile, benzonitrile, and the like. It is also convenient to employ a polyepoxide, such as one of the glycidyl polyethers of the dihydric phenol, in admixture with a normally liquid glycidyl polyether of a polyhydric alcohol. In fact, two or more of any of the polyepoxides may be used together as mixtures. In such a case, the amount of adduct added and commingled is based on the average equivalent weight of the polyepoxide.

Various other ingredients may be mixed with the polyepoxide subjected to cure with the sulfur (or phosphorus) hydroxy-containing polyamines including pigments, fillers, dyes, plasticizers, resins, and the like.

One important application of the use of the new sulfur (or phosphorus) hydroxy-containing polyamines as curing agents for polyepoxides is in the preparation of laminates or resinous articles reinforced with fibrous textiles. Although it is generally preferred to utilize glass cloth for this purpose, any of the other suitable fibrous materials in sheet form may be employed such as glass matting, paper, asbestos paper, mica flakes, cotton bats, duck muslin, canvas and the like. It is useful to prepare the laminates from woven glass cloth that has been given prior treatment with well known finishing or sizing agents therefor, such as chrome methacrylate or vinyl trichlorosilane.

In preparing the laminate, the sheets of fibrous material are first impregnated with the mixture of the polyepoxide and the curing agent. This is conveniently accomplished by dissolving the curing agent int acetone and mixing the solution with the polyepoxide so as to obtain a fluid mixture. The sheets of fibrous material are impregnated with the mixture by spreading it thereon or by dipping or otherwise immersing them in the impregnant. The solvent is conveniently removed by evaporation and the mixture is cured to the fusible resin stage. Although this operation may be conducted at room temperature (20 to 25° C.), it is preferred to use somewhat elevated temperature such as about 50° C. to 200° C. with the impregnated sheet stock passing through or hanging free in an oven or other suitable equipment. The resinification is arrested before infusible product occurs by cooling below about 40° C., preferably to about 20° C. to 25° C. A plurality of the impregnated sheets are then superimposed and the assembly is cured in a heated press under a pressure of about 25 to 500 or more pounds per square inch. The resulting laminate is extremely strong and resistant against the action of organic and corrosive solvents.

The compositions of the invention are also useful for protective coatings. In this application they are preferably dissolved in an organic solvent and this mixture applied to the desired surface. Various solvents are suitable for this purpose such as lower saturated ketones like acetone, methyl ethyl ketone, methyl isobutyl ketone, methyl hexyl ketone, cyclohexanone, methyl cyclohexanone, etc.; esters like ethyl acetate, isopropyl acetate, butyl acetate, isoamyl acetate, etc.; and monoalkyl ethers of ethylene glycol like methyl, ethyl or butyl ethers. Preferably such solvents having a boiling point below 175° C. If desired, other materials like lower aromatic hydrocarbons such as benzene, toluene and/or xylene may be used in combination with the oxygen-containing compounds for the purpose of cheapening the cost of the solvent.

The solutions of the compositions of the invention are applied for coating surfaces needed to be protected by brushing, spraying and the like. The amount of solvent contained in the solution may be varied to suit the particular need. Ordinarily, the solution will contain about 5% to 60% of the composition of the invention. The solution is applied to the surface to be coated, and either the solvent is first allowed to evaporate, after which heat is applied by circulating hot air or by use of infra-red lamps, or the heating is effected witth simultaneous removal of solvent and curing.

When used as film-forming agents, the compositions may have various other materials incorporated therewith besides solvents such as pigments and other resins. Thus pigments like titanium oxide, antimony oxide, carbon black, chrome yellow, zinc oxide, para red, and the like, may be used. Best results in preparing the enamels are obtained by grinding the pigment with a portion of the solvent and expoxy ether, and then adding the remainder of the solvent and epoxy ether after the grinding operation. The enamel is ready for application upon addition of the curing agent.

The polyepoxides to be cured by use of the above process are those organic compounds containing a plurality of epoxy groups, i.e.,

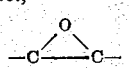

groups. These compounds may be saturated or unsaturated, aliphatic, cycloaliphatic, aromatic or heterocyclic and may be substituted if desired with substituents, such as halogen atoms, OH groups, ether radicals, and the like.

For clarity, polyepoxides and particularly those of the polymeric type are preferably described in terms of an epoxy equivalency. The term "epoxy equivalency" as used herein refers to the average number of epoxy groups contained in the average molecule. This value is obtained by dividing the average molecular weight of the polyepoxide by the epoxide equivalent weight. The epoxide equivalent weight is determined by heating a one-gram sample of the polyepoxide with an excess of pyridinium chloride dissolved in pyridine. The excess pyridinium chloride is then back titrated with 0.1 N sodium hydroxide to phenolphthalein end point. The epoxide value is calculated by considering one HCl as equivalent to one epoxide group. This method is used to obtain all epoxide values reported herein.

If the polyepoxide material consists of a single compound and all of the epoxy groups are intact, the epoxy equivalency will be integers, such as 2, 3, 4, and the like. However, in the case of polymeric-type polyether polyepoxides many of the materials may contain some of the monomeric monoepoxides or have some of their epoxy groups hydrated or otherwise reacted and/or contain macromolecules of somewhat different molecular weight so the epoxy equivalency may be quite low and contain fractional values. The polymeric material may, for example, have an epoxy equivalency of 1.5, 1.8, 2.5, and the like.

Examples of polyepoxides suitable for use in the present process are given in U.S. 2,633,458 and it is understood that so much of the disclosure of that patent relative to polyepoxides is incorporated by reference into this specification. Glycidyl polyethers referred to in U.S. 2,633,458 are also called "ethoxyline" resins.

To illustrate the manner in which the invention may be carried out, the following examples are given. It is to be understood, however, that the examples are for the purpose of illustration and the invention is not to be regarded as limited to any of the specific materials or conditions recited therein.

The polyethers referred to in the examples such as, for example, Polyether A, are those described in U.S. 2,633,458.

*Example I*

This example illustrates the preparation and some of the properties of N-(3-ethylthio-2-hydroxypropyl) diethylene triamine.

One mol of ethyl mercaptan was slowly added to one mole of epichlorohydrin and the mixture maintained at 10° C. to 20° C. At the end of one hour 30% NaOH, 10% in excess of theory, was added and the reaction maintained at 40° C. for 1 hr. The salts were washed out with water and the epoxide distilled. The distillate was slowly added to a 3 molar excess of diethylene triamine and the mixture heated to 80° C. The product was then stabilized by distilling under reduced pressure to yield a slightly yellow colored liquid identified as N-(3-ethyl-thio-2-hydroxypropyl) diethylene triamine.

100 parts of diglycidyl ether of 2,2-bis(4-hydroxyphenyl) propane having a molecular weight of about 350 and an epoxy value of 0.50 eq./100 g. (Polyether A) was mixed with 28.3 parts of N-(3-ethylthio-2-hydroxypropyl) diethylene triamine produced above. This mixture could be easily handled and did not have the high toxicity of mixtures containing the diethylene triamine by itself.

Castings were prepared by heating 100 parts of Polyether A with 28.3 parts of N-(3-ethylthio-2-hydroxypropyl) diethylene triamine at 60° C. for several hours. The resulting products were light yellow hard castings. They showed good hardness even after being placed in boiling acetone for 3 hours and after being placed in boiling water for 3 hours.

The corresponding N-(3-ethylsulfonyl-2-hydroxypropyl) diethylene triamine was prepared by treating the chlorohydrin in the above process before addition of NaOH, with a double molar quantity of aqueous $H_2O_2$.

*Example II*

This example illustrates the preparation and some of the properties of N-(3-octylthio-2-hydroxypropyl) ethylene diamine.

One mole of octyl mercaptan was slowly added to one mole of epichlorohydrin and the mixture maintained at 10° C. to 30° C. At the end of 3 hours, 1 mole of 45% aqueous NaOH was added, with vigorous stirring while maintaining a temperature of 40–60° C. After several hours benzene was added and NaCl filtered off. The entire product in the benzene solution was slowly run into 6 moles diethylene triamine and heated to 80° C. for 15 minutes to complete the reaction. Solvent and excess diethylene triamine were removed and the product identified as N-(3-octylthio-2-hydroxypropyl) ethylene diamine.

100 parts of Polyether A was mixed with 32 parts of N-(3-octylthio-2-hydroxypropyl) ethylene diamine. This mixture could be easily handled and did not have the high toxicity of the mixtures containing the ethylene diamine as the curing agent. The mixture gelled in a short time after mixing.

Castings were prepared by heating 100 parts of Polyether A with 32 parts of the N-(3-octylthio-2-hydroxypropyl) ethylene diamine at 80° C. The resulting products were light yellow hard castings which maintained their hardness even after being placed in boiling water for 3 hours.

A curing agent having related properties is obtained by replacing the octyl mercaptan in the above-noted preparation process with an equivalent amount of each of the following mercaptans: cyclohexyl mercaptan, dodecyl mercaptan and isooctyl mercaptan.

The corresponding sulfonyl derivatives were also obtained by treating the chlorohydrin, before adding NaOH, with a double molar quantity of $H_2O_2$.

*Example III*

This example illustrates the preparation and some of the properties of N-(3-phenylthio-2-hydroxypropyl) diethylene triamine.

One mole of epichlorohydrin was added to one mole of phenyl mercaptan and 1 mole of NaOH slowly added thereto at 10° C. to 20° C. At the end of one hour, the salt was filtered off and the product slowly added to 3 moles of diethylene triamine and the mixture heated to 80° C. for two hours. The product was then stabilized by distilling under reduced pressure to yield a yellow colored liquid identified as N-(3-phenylthio-2-hydroxypropyl) diethylene triamine.

100 parts of Polyether A was mixed with 35 parts of N-(3-phenylthio-2-hydroxypropyl) diethylene triamine produced above. This mixture could be easily handled and did not have the high toxicity of mixtures containing diethylene triamine by itself. The mixture gelled at room temperature in a few minutes.

Castings were prepared by heating 100 parts of Polyether A with 36 parts of N-(3-phenylthio-2-hydroxypropyl) diethylene triamine at 80° C. The resulting products were light yellow colored castings which maintained their hardness even after being placed in boiling water and in boiling acetone for three hours.

*Example IV*

This example illustrates the preparation and some of the properties of N-(3-dicyclohexylphosphino-2-hydroxypropyl) diethylene triamine.

One mol of dicyclohexyl phosphine was slowly added to one mole of epichlorohydrin and the mixture maintained at 100° C. to 200° C. At the end of 3 hours, one mole of NaOH was added while maintaining a temperature of 10–20° C. Benzene was added and the salt filtered off. The benzene solution was added to 3 moles of diethylene triamine and the mixture heated to 80° C. for several hours. The product was then stabilized by distilling under reduced pressure to yield a viscous liquid identified as N-(3-dicyclohexyl-phosphino-2-hydroxypropyl) diethylene triamine.

100 parts of Polyether A was mixed with 45 parts of the N-(3-dicyclohexylphosphino-2-hydroxypropyl) diethylene triamine produced above. This mixture could be easily handled and had a low order of toxicity. The mixture gelled at room temperature in a few minutes.

Castings were prepared by heating 100 parts of Polyether A with 47 parts of the above-noted curing agent at 80° C. The resulting products were hard castings which maintained their hardness even after being placed in boiling water and boiling acetone for three hours.

Curing agents having related properties are obtained by replacing the dicyclohexyl phosphine in the above-noted preparation process with an equivalent amount of each of the following phosphines: dioctyl phosphine, diphenyl phosphine and didodecyl phosphine.

The corresponding phosphinyl compounds were obtained by treating the halohydrin, before adding NaOH, with an equal molar amount of $H_2O_2$.

*Example V*

This example illustrates the preparation and some of the properties of N-(3-butylthio-2-hydroxypropyl) hexamethylene diamine.

One mol of butyl mercaptan was slowly added to one mole of epichlorohydrin and the mixture maintained at 10° C. to 20° C. At the end of one hour, the mixture was run into an alcoholic solution of 1.0 mole NaOH and 3 moles of hexamethylene diamine. The reaction mixture was heated to 40° C. for several hours and the solvent and excess amine removed at reduced pressure. The product was filtered from the salt and distilling under reduced pressure to yield a slightly yellow colored liquid identified as N-(3-butylthio-2-hydroxypropyl) hexamethylene diamine.

90 parts of Polyether B and 10 parts of allyl glycidyl ether were mixed with aluminum oxide and with 10 parts of the N-(3-butylthio-2-hydroxypropyl) hexamethylene diamine to form an adhesive composition. This mixture was also easily handled and had less toxicity than similar compositions containing the hexamethylene diamine. The mixture set up at room temperature in a few minutes. A portion of the mixture before gellation was placed between two pieces of aluminum and the combination heated at 140° C. for several hours. At that time, the adhesive had set to form a strong bond.

Related results are obtained by replacing the mixture of Polyester B and allyl glycidyl ether in the above experiment with each of the following mixtures:

Polyester B—90 parts and allyl glycidyl ether—10 parts; Polyether B—75 parts and Polyether F—25 parts; Polyether B—80 parts and allyl glycidyl ether—20 parts.

*Example VI*

This example illustrates the preparation and some of the properties of N-(3-ethylthio-2-hydroxypropyl) meta-phenylene diamine.

One mol of ethyl mercaptan was slowly added to one mole of epichlorohydrin and the mixture maintained at 10° C. to 20° C. At the end of one hour 30% NaOH, 10% in excess of theory, was added and the reaction maintained at 40° C. for 1 hour. The salt was washed out with water and the epoxide distilled. The distillate was slowly added to a 3 molar excess of meta-phenylene diamine in benzene and the mixture heated to 80° C. The product was then stabilized by distilling under reduced pressure to yield a liquid identified as N-(3-ethylthio-2-hydroxpyropyl) meta-phenylene diamine.

90 parts of Polyether B and 10 parts of allyl glycidyl ether were mixed with aluminum oxide and with 10 parts of the N-(3-ethylthio-2-hydroxypropyl) meta-phenylene diamine produced above. A casting was prepared by heating this mixture to 125° C. for several hours. The resulting product was a hard solvent resistant casting.

I claim as my invention:

1. A compound from the group N-(3-X-thio-2-hydroxypropyl)-Y, N-(3-diX-phosphino-2-hydroxypropyl)-Y, N-(3-X-sulfonyl-2-hydroxypropyl)-Y and N-(3-diX-phosphinyl-2-hydroxypropyl)-Y wherein X is a radical selected from the group consisting of alkyl radicals having from 2 to 12 carbon atoms, cyclohexyl and phenyl, and Y is a polyamine radical selected from the group consisting of ethylene diamine, polyethylene polyamines having from 2 to 4 amine nitrogens and having no more than 12 carbon atoms in any alkyl group and meta-phenylene diamine.

2. N-(3-phenylthio-2-hydroxypropyl) diethylene triamine.

3. N-(3-octylthio-2-hydroxypropyl) ethylene diamine.

4. N-(3-ethylthio-2-hydroxypropyl) diethylene triamine.

5. N-(3-ethylthio-2-hydroxypropyl) metha-phenylene diamine.

6. N-(3-butylthio-2-hydroxypropyl) hexamethylene diamine.

7. N-(3-(dicyclohexyl)phosphino-2-hydroxypropyl) diethylene triamine.

References Cited in the file of this patent

UNITED STATES PATENTS

| | | |
|---|---|---|
| 2,393,825 | Senkus | Jan. 29, 1946 |
| 2,406,573 | Vogl | Aug. 27, 1946 |
| 2,548,679 | Olin | Apr. 10, 1951 |
| 2,615,008 | Greenlee | Oct. 21, 1952 |
| 2,623,831 | Mikeska | Dec. 30, 1952 |
| 2,668,807 | Greenlee | Feb. 9, 1954 |
| 2,817,675 | Hoffer et al. | Dec. 24, 1957 |

OTHER REFERENCES

Ninitzescu et al.: Ber. Deut. Chem., vol. 68B (1935), p. 587–591.

Karrer: Organic Chemistry (Textbook) (1938); page 107, Nordeman Publishing Co., New York.